United States Patent
Gruenauer et al.

(10) Patent No.: US 8,640,961 B2
(45) Date of Patent: Feb. 4, 2014

(54) TRANSPONDER INLAY WITH ANTENNA BREAKING LAYER FOR A DOCUMENT FOR PERSONAL IDENTIFICATION, AND A METHOD FOR PRODUCING A TRANSPONDER INLAY

(75) Inventors: Matthias Gruenauer, Regensburg (DE); Andreas Karl, Tagernheim (DE); Andreas Mueller-Hipper, Regensburg (DE); Frank Pueschner, Kelheim (DE); Peter Scherl, Nuremberg (DE)

(73) Assignee: Infineon Technologies AG, Neubiberg (DE)

( * ) Notice: Subject to any disclaimer, the term of this patent is extended or adjusted under 35 U.S.C. 154(b) by 104 days.

(21) Appl. No.: 13/248,052

(22) Filed: Sep. 29, 2011

(65) Prior Publication Data
US 2012/0074228 A1    Mar. 29, 2012

(30) Foreign Application Priority Data
Sep. 29, 2010    (DE) .......................... 10 2010 046 965

(51) Int. Cl.
*G06K 19/02* (2006.01)
*G06K 19/06* (2006.01)

(52) U.S. Cl.
USPC .......................................... 235/488; 235/492

(58) Field of Classification Search
USPC ................................ 235/492, 488; 340/572.7
See application file for complete search history.

(56) References Cited

U.S. PATENT DOCUMENTS

| | | | |
|---|---|---|---|
| 7,059,535 B2 | 6/2006 | Rietzler | |
| 2005/0230960 A1* | 10/2005 | Bilodeau et al. | 283/75 |
| 2009/0315320 A1* | 12/2009 | Finn | 283/107 |

FOREIGN PATENT DOCUMENTS

| | | |
|---|---|---|
| DE | 10338444 A1 | 6/2005 |
| DE | 102008049669 A1 | 4/2010 |

OTHER PUBLICATIONS

English Language Abstract of DE 102008049669 A1.

* cited by examiner

*Primary Examiner* — Thien M Le
*Assistant Examiner* — Toan Ly

(57) ABSTRACT

In various embodiments, a transponder inlay for a document for personal identification may include a cover; an adhesive layer arranged on the cover; a chip arranged on the adhesive layer; an antenna connected to the chip; and a top layer on the adhesive layer, wherein the top layer has a top and a bottom and wherein the bottom of the top layer is connected to the cover by means of the adhesive layer and wherein the antenna is arranged on the top of the top layer such that the antenna is at least to some extent physically separated from the adhesive layer by the top layer.

18 Claims, 1 Drawing Sheet

TRANSPONDER INLAY WITH ANTENNA BREAKING LAYER FOR A DOCUMENT FOR PERSONAL IDENTIFICATION, AND A METHOD FOR PRODUCING A TRANSPONDER INLAY

CROSS-REFERENCE TO RELATED APPLICATION

This application claims priority to German Patent Application Serial No. 10 2010 046 965.3, which was filed Sep. 29, 2010, and is incorporated herein by reference in its entirety.

TECHNICAL FIELD

Various embodiments relate to a transponder inlay for a document for personal identification and to a method for producing a transponder inlay.

BACKGROUND

On account of continually increasing safety demands, there are miscellaneous efforts to improve existing systems for personal identification or to provide new identification options which allow simplified and faster capture of person-specific data for personal identification. Since there are very different standards relating to data capture, particularly in the field of personal documents to be carried by people, it has been found to be necessary for even advanced systems, such as person recognition by means of transponder, to be able to be used in addition.

One option for implementing dual identification systems of this kind is to provide a conventional identification card with a transponder, which identification card stores the data in the chip module of the transponder in compliance with the personal data shown in the security imprint on the identification paper and allows them to be retrieved contactlessly using a suitable reading device. In this case, increasing consideration needs to be given to security aspects. Measures need to be taken which prevent the personal identification transponder from being interchanged, removed or manipulated.

DE 103 38 444 A1 discloses a transponder inlay for a document for personal identification with an identification page. The transponder inlay has a multilayer design. A transponder substrate holds a transponder unit, including an integrated circuit, also usually called a chip, and an antenna. Two inlay top layers hold the transponder substrate with the transponder unit between them.

SUMMARY

In various embodiments, a transponder inlay for a document for personal identification may include a cover; an adhesive layer arranged on the cover; a chip arranged on the adhesive layer; an antenna connected to the chip; and a top layer on the adhesive layer, wherein the top layer has a top and a bottom and wherein the bottom of the top layer is connected to the cover by means of the adhesive layer and wherein the antenna is arranged on the top of the top layer such that the antenna is at least to some extent physically separated from the adhesive layer by the top layer.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Figure 1:
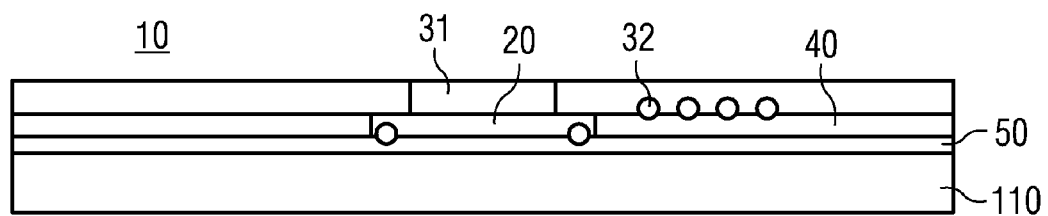
FIG. 1 shows a sectional side view of various embodiments of a transponder inlay.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments of the transponder inlay for a document for personal identification are explained in more detail below with reference to the figures.

Various embodiments provide a transponder inlay which can be produced inexpensively and which is nevertheless secure.

The transponder inlay according to various embodiments for a document for personal identification includes a transponder substrate having one or more cutouts and a layer of adhesive which is mounted on one side of the transponder substrate, a chip which is arranged on the adhesive layer and which is connected to an antenna, and a top layer, wherein the top layer has a top and a bottom and wherein the bottom of the top layer is connected to the cover by means of the adhesive layer and wherein the antenna is arranged on the top of the top layer such that the antenna is at least to some extent physically separated from the adhesive layer by the top layer. This design of the transponder inlay may ensure that it is possible to expose the chip/antenna complex only if the chip/antenna complex is destroyed in the process. This may allow reading of information following forcible exposure of the chip/antenna complex to be effectively prevented.

The method according to various embodiments for producing a transponder inlay for a document for personal identification involves a first elemental layer of a top layer being produced. An antenna is put on the first elemental layer. A second elemental layer of the top layer is put on the first elemental layer such that the antenna is arranged between the first elemental layer and the second elemental layer. The antenna is then connected to a chip. The top layer with the antenna arranged between the first elemental layer and the second elemental layer is adhesively bonded to a cover and the chip is adhesively bonded to the cover.

As a result of the simple design and when a plurality of top layers are also used, the transponder inlay is less complex to produce than known transponder inlays having a multilayer design, since fewer production steps have to be undergone during manufacture. For example in high-volume manufacture, as is the case with identification transponders, components which are of simple design and simple to manufacture guarantee a cost advantage and hence a competitive advantage. In addition, thin transponder inlays are particularly well suited to integration into personal identification documents and nevertheless afford a maximum level of security.

In various embodiments, further top layers may be arranged such that the antenna is at least to some extent arranged between the top layer and the further top layers. For example using lamination, it is possible for top layers to be connected to one another easily and inexpensively.

A particularly good connection between the transponder substrate and the top layer may be provided if the adhesive layer or layer of adhesive includes an adhesive film, e.g. hotmelt adhesive—called hotmelt. An adhesive film of this kind may be used to produce an inexpensive and easy-to-produce connection between the transponder substrate and the top layer.

In addition, the adhesive used for the layer of adhesive may also be, inter alia, epoxy resin, cyanoacrylate, silicones, gripping adhesives, polyurethane adhesives and radiation-curing adhesives.

Furthermore, the top layer, which may also be of multilayer design, may have a cutout or recess for holding the chip, so that it is possible to produce a transponder inlay with little physical height.

In various embodiments, the top of the further top layer terminates flush with the top of the chip. The transponder inlay may have not only the top layer and the further top layer but additionally further top layers, in which case the topmost side of the additionally further top layers terminates flush with the top of the chip. This may result in a form which, overall in relation to the surfaces of the transponder inlay, is plane parallel and which allows an extremely thin binding top layer, for example, to be put on, so that the chip does not show on the surface.

The antenna may be in the form of a coil having at least one turn. The antenna may be a wire antenna. Other kinds of antennas, for example produced by printing or etching technology, are also possible. The cutout in the top layer, which holds the antenna at least to some extent, may be arranged in the region of the innermost coil turn. One or more cutouts may be provided. In one exemplary embodiment, in which the antenna likewise includes a coil having at least one turn, the cutout may be situated on the top of the top layer. In the case of multiple cutouts, these may be arranged in the form of a pattern or tiling. The cutouts may be inside and outside the antenna coil. The number, size, shape and position of the cutout can vary depending on the embodiment.

It may be advantageous if the coil of the antenna is arranged on the top layer and the top layer has cutouts which are suitable for holding the coil of the antenna. This may ensure a flat design for the transponder inlay. In addition, the coil of the antenna is protected against mechanical loads, for example, by virtue of its being held in the cutouts in the top layer.

It may be advantageous if the top layer is produced from a foamed plastic. The pores of the foamed plastic of the top layer result in a particularly good connection to be adhesive in the layer of adhesive. The transponder substrate usually has a thermoplastic plastic, since they can easily be deformed in a particular temperature range. The process is reversible. The top layer may also have a plurality of elemental layers.

It may be advantageous if the transponder inlay forms an identification page or is produced in an identification page. To this end, the transponder inlay can also be provided with a security imprint directly. The transponder inlay according to the invention may be introduced into a document for personal identification, for example a passport, using the adhesive layer, for example. The binding of such a document for personal identification frequently includes a cardboard or fabric layer and is called the cover or the book cover binding. The transponder inlay according to the invention may advantageously be connected to the cover or an identification page of the document for personal identification using the adhesive layer.

FIG. 1 shows a sectional profile through a first exemplary embodiment of the transponder inlay 10 according to various embodiments. The transponder inlay 10 is suitable for use in a document for personal identification. The cover 20, for example an identification page, holds a transponder unit 30, including a chip 31 and an antenna 32. The top layer 40 is not closed in this exemplary embodiment, but rather has a window opening in the region of the chip 31. The chip 31 is mounted on the transponder substrate 20 using flip-chip technology, for example. The transponder substrate 20 likewise holds the connections of the antenna 32. In various embodiments, the connections of the antenna 32 are situated on that side of the transponder substrate 20 which faces the cover. The antenna coil 32 is incorporated between a first and a second top layer 40 in various embodiments. The antenna coil 32 may alternatively have been put on the top layer 40. In various embodiments, the antenna coil may have been laid in cutouts which are produced such that the antenna coil terminates flush with the surface of the top layer 40. The chip 31 and the top layer 40 have been put on the cover 110 using an adhesive layer 50, the adhesive layer in this embodiment being a sticky layer. The adhesive layer may in various embodiments include hotmelt. If an attempt is made to remove the top layer together with the chip from the cover, the chip remains on the adhesive layer 50 and the antenna is separated from the chip 31 on account of the arrangement in or on the top layer. This ensures that the chip/antenna arrangement comes apart ("disassembled") and is destroyed in the event of an external attack.

Figure 2:
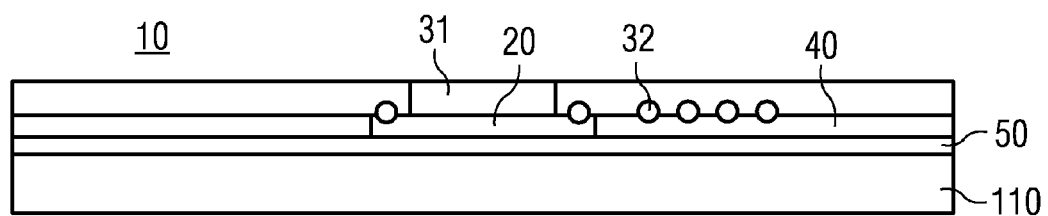
FIG. 2 shows a sectional side view of various embodiments of a transponder inlay.

FIG. 2 shows a sectional profile through various embodiments of the transponder inlay 10. In various embodiments, the connections of the antenna 32 are likewise situated on the transponder substrate 20. The connections of the antenna 32 in various embodiments are on that side of the transponder substrate 20 which is remote from the cover. The chip 31 and the top layer 40 have been put onto the cover 110 using an adhesive layer 50. In various embodiments, the layer of adhesive 50 may include epoxy resin. If, in various embodiments, as already in the various embodiments from FIG. 1, an attempt is made to remove the top layer together with the chip from the cover in this case, the chip remains on the adhesive layer 50 and the antenna is separated from the chip 31 on account of the arrangement in or on the top layer. This ensures that in various embodiments too the chip/antenna arrangement is "disassembled", that is to say comes apart, in the event of an external attack.

Figure 3:
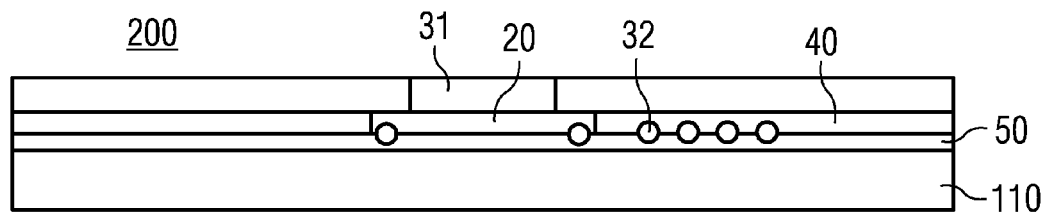
FIG. 3 shows a sectional side view of a conventional transponder inlay for personal identification.

FIG. 3 shows a conventional document for personal identification 200. If one attempts to separate the cover 110 and the top layer 40 forcibly, the antenna 32 and the chip 31 remain adhesively bonded to the cover 110. The chip/antenna complex can therefore easily be exposed without destruction. It is possible for the information on the chip 31 to be read electrically.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A transponder inlay for a document for personal identification, the transponder inlay comprising:
a cover;
an adhesive layer arranged on the cover;
a chip arranged on the adhesive layer;
an antenna connected to the chip such that antenna connections are on
the adhesive layer; and
a first top layer on the adhesive layer,
wherein the first top layer has a top and a bottom arid wherein the bottom of the first top layer is connected to the cover by means of the adhesive layer and
wherein the antenna is arranged on the top of the first top layer such that the antenna is at least to some extent physically separated from the adhesive layer by the first top layer.

2. The transponder inlay as claimed in claim 1, wherein a second top layer is arranged such that the antenna is at least to some extent arranged between the first top layer and the second top layer.

3. The transponder inlay as claimed in claim 2, wherein the first top layer and the second top layer are connected to one another.

4. The transponder inlay as claimed in claim 2, wherein the top of the second top layer is produced flush with the top of the chip.

5. The transponder inlay as claimed in claim 1, wherein the adhesive layer is an adhesive film which has hotmelt.

6. The transponder inlay as claimed in claim 1, wherein the adhesive layer has epoxy resin.

7. The transponder inlay as claimed in claim 1, wherein the antenna has a coil having at least one turn.

8. The transponder inlay as claimed in claim 1, wherein the at least one turn of the coil is arranged on the first top layer and the first top layer has cutouts which are suitable for holding the coil.

9. The transponder inlay as claimed in claim 1, wherein the first top layer has a cutout for holding the chip.

10. The transponder inlay as claimed in claim 1, wherein the first top layer is produced from foamed plastic.

11. The transponder inlay as claimed in claim 1, comprising a second top layer on the first top layer, and
wherein the antenna is arranged on a top of the second top layer such that the antenna is at least to some extent physically separated from the adhesive layer by the first top layer and the second top layer.

12. A document for personal identification, comprising:
a transponder inlay, comprising:
a cover;
an adhesive layer arranged on the cover;
a chip arranged on the adhesive layer;
an antenna connected to the chip such that antenna connections are on
the adhesive layer; and
a first top layer on the adhesive layer, wherein the first top layer has a top and a bottom and wherein the bottom of the top layer is connected to the cover by means of the adhesive layer and wherein the antenna is arranged on the top of the first top layer such that the antenna is at least to some extent physically separated from the adhesive layer by the first top layer.

13. The document for personal identification as claimed in claim 12,
wherein the transponder inlay comprises
a second top layer on the first top layer, and
wherein the antenna is arranged on a top of the second top layer such that the antenna is at least to some extent physically separated from the adhesive layer by the first top layer and the second top layer.

14. A method for producing a transponder inlay, the method comprising:
providing a first elemental layer of a first top layer;
putting an antenna on the first element layer;
putting a second elemental layer of the first top layer on the first elemental layer such that the antenna is arranged between the first elemental layer and the second elemental layer;
connecting the antenna to a chip;
adhesively bonding the first top layer having the antenna arranged between the first elemental layer and the second elemental layer to a cover; and
adhesively bonding the chip to the cover such that antenna connections are on the adhesive layer.

15. The method as claimed in claim 14,
wherein a recess for holding the chip is produced in the first top layer by means of punching.

16. The method as claimed in claim 14,
wherein a recess is produced in the first top layer for the purpose of holding the chip by means of milling.

17. The method as claimed in claim 14,
wherein the first elemental layer of the first top layer and the second elemental layer of the first top layer are connected adhesively.

18. The method as claimed in claim 14, comprising providing a second top layer on the first top layer, and
wherein the antenna is arranged on a top of the second top layer such that the antenna is at least to some extent physically separated from the adhesive layer by the first top layer and the second top layer.

* * * * *